UNITED STATES PATENT OFFICE.

JOHN R. ALSING, OF HOBOKEN, NEW JERSEY.

PIGMENT FOR DISTEMPER-PAINTING.

SPECIFICATION forming part of Letters Patent No. 264,214, dated September 12, 1882.

Application filed June 8, 1882. (No specimens.)

*To all whom it may concern:*

Be it known that I, JOHN ROBERT ALSING, a citizen of the Kingdom of Sweden, and a resident of Hoboken, in the county of Hudson and State of New Jersey, have invented a new and useful Improvement in Pigments for Distemper-Painting, of which the following is a specification.

My composition consists of the following ingredients, combined in the following proportions: carbonate of lime, three parts; oxide of magnesium, (magnesia,) one part. These ingredients are granulated, and then reduced by my triturating-cylinder to an impalpable powder, after which, being thoroughly mixed by the triturating process, the composition is ready for use by fresco-painters in the ordinary manner. Experiments have proved that a variation of the above-stated proportion between the ingredients will impair the quality of the pigment, though if the variation be only slight this may be remedied by the admixture before trituration of a very small proportion of albumen. This, however, is risky, and should be done very carefully, as the least excess of albumen will impair instead of improve the quality. An increase in the proportion of magnesia will make the surface too "greasy" or slippery to properly receive fresco-colors, and an increase in the proportion of carbonate of lime causes the colors to spread and makes the surface loose and liable to crumble, although chalk or calcareous earths (sometimes containing magnesia) generally form one of the main ingredients in pigments used for calcimining and for groundwork of fresco-decorations, still the great annoyance to fresco-painters has always heretofore been that the ground-surface produced was either too loose and dissolved in the colors applied in decorating, or too hard and peeled off when the colors were applied, and too coarse, causing dust to adhere, besides having insufficient covering capacity, or, as it is termed, "weak body." Repeated tests have proved that the pigment composed of the above materials, triturated in the above proportions, produces an excellent working-surface, which neither dissolves nor peels off when the decorating-color is applied. Its tone is a pure, clear white. It has a "strong body" and consequent covering capacity, and dust does not adhere to it, but comes off readily when the dust-brush is applied.

I am aware that a compound of talc and alum mixed with hydrate of lime, or, as it is generally called, "slaked lime," has been patented for a similar purpose, and I do not claim such composition; nor do I claim water-slaked or hydrated lime at all, as that does not enter into my compound, neither does alum.

Having thus described my improvement, I claim as new and desire to secure by Letters Patent—

The hereinbefore-described pigment for fresco-painting, consisting of carbonate of lime and oxide of magnesium, mixed and triturated in the proportions stated.

In testimony that I claim the foregoing as my invention I have signed my name, in presence of two witnesses, this 26th day of May, 1882.

JOHN ROBERT ALSING.

Witnesses:
CHAS. P. THORE,
ALB. HOFFMAN.